3,513,180
PREPARATION OF CARBOXYLIC ANHYDRIDES
Donald M. Fenton, Anaheim, Calif., assignor to Union Oil Company of California, Los Angeles, Calif., a corporation of California
No Drawing. Filed June 30, 1967, Ser. No. 650,263
Int. Cl. C07c 53/22, 63/06
U.S. Cl. 260—398                                  11 Claims

ABSTRACT OF THE DISCLOSURE

Prepartion of carboxylic anhydrides by dehydration of the corresponding carboxylic acid in the presence of a catalytic amount of a 1,2-dicarboxylic acid or anhydride.

---

It is known that 1,2-dicarboxylic acids, such as phthalic acid, will readily dehydrate to form the corresponding anhydride at a temperature of about 230° C., provided the by-product water is removed. However, dehydration of monocarboxylic acids is much more difficult, probably because the carboxylic acid groups are not closely associated spacially, as is the case with the 1,2-dicarboxylic acids. It is therefore an object of the present invention to provide a process whereby the monocarboxylic acids may also be readily dehydrated.

It has now been found that this objective may be accomplished by carrying out the dehydration reaction in the presence of a small amount of a 1,2-dicarboxylic acid or the corresponding anhydride which acts to catalyze the dehydration of the monocarboxylic acids. At the temperature employed in the dehydration the 1,2-dicarboxylic acids are readily dehydrated, as explained above, and it is therefore believed that the corresponding anhydride is the active ingredient in catalyzing dehydration of the monocarboxylic acids.

The anhydrides formed by the method of the invention are useful in the prepartion of esters by reaction with alcohols. They are particularly useful in the preparation of cellulose esters or derivatives thereof since the reaction of the anhydride and cellulose or its derivatives can be carried out at a substantially lower temperature than the corresponding acid-cellulose reaction. Decomposition of the cellulose at higher temperatures is thus avoided when the anhydride is used as the esterifying agent. The esters and their derivatives, of course, find wide utility in preparation of perfumes, solvents, etc.

Monocarboxylic acids that may be dehydrated by the process of the invention include saturated and unsaturated aliphatic, alicyclic, aromatic and heterocyclic acids having from about 2 to 18 carbons, as well as derivatives of these acids. Examples are acetic, propionic, caprylic, lauric, stearic, crotonic, oleic, linoleic, cyclopropanecarboxylic, cyclohexanecarboxylic, cyclohexenecarboxylic, cyclodecanecarboxylic, benzoic, toluic, phenylacetic, cinnamic, 1-naphthylacetic, nicotinic and benzofuroic acids.

The catalyst of the present invention may be any five member ring anhydride that is formed from a 1,2-dicarboxylic acid, or the corresponding dicarboxylic acid itself may be used. Anhydrides are readily formed from these acids since the five member ring structure is stable and is readily formed from the 1,2-dicarboxylic acid at temperatures in excess of about 220° C. when provision is made for removal of water. Suitable 1,2-dicarboxylic acids include saturated and unsaturated aliphatic, alicyclic, aromatic and heterocyclic acids having from about 4 to 22 carbons, and derivatives of these acids. Examples are succinic, maleic, cyclohexane 1,2-dicarboxylic, phthalic, trimellitic, and quinolinic acids.

The temperature of the dehydration reaction of the invention may range from about 200° to 300° C. with about 230° to 260° C. being a preferred range. Atmospheric pressure is generally suitable, but pressures of from about $10^{-5}$ p.s.i.g. to 10,000 p.s.i.g. may be used. Proportions of the catalyst will vary from about 0.001 to 10 wt. percent based on the weight of the acid to be dehydrated, with 0.1 to 1 wt. percent being the preferred range. Optimum values of these variables will vary with the acid to be dehydrated, the particular catalyst employed, efficiency of water removal, etc., and are best determined experimentally.

By-product water may be removed by any convenient means, usually by distillation. Although the dehydration reaction is essentially quantitative, the conversion is limited by the efficiency of water removal. Simple fractional distillation apparatus gives conversions of about 30%.

The invention may also be used to prepare anhydrides from two different monocarboxylic acids, although this will, of course, generally result in a mixture of products containing also the anhydrides of the single acids.

The following examples will serve to more specifically illustrate the invention.

EXAMPLE 1

100 g. of cyclohexanecarboxylic acid and 2 g. of phthalic anhydride were heated to gentle reflux at 230° C. for 52 hours, during which time water was evolved and continuously removed by distillation. There was isolated by distillation 30 g. of cyclohexanecarboxylic anhydride, $n_D^{25}$ 1.4752, B.P. 140–150°/2 mm. There were strong bands in the infra-red spectrum at 1790 and 1730 cm.$^{-1}$ corresponding to anhydride groups.

EXAMPLE 2

The same procedure as in Example 1 was repeated except that 1 g. of trimellitic anhydride was used as the catalyst. 26 g. of cyclohexanecarboxylic anhydride were formed after 24 hours at reflux.

EXAMPLE 3

The procedure of Example 2 was repeated except that 1 g. of succinic acid was used as the catalyst. 22 g. of cyclohexanecarboxylic anhydride was formed.

EXAMPLE 4

The procedure of Example 3 was repeated, except that no catalyst was used. Only 10 g. of cyclohexanecarboxylic anhydride was formed.

EXAMPLE 5

The procedure of Example 1 was repeated using 100 g. of octanoic acid and ½ g. of trimellitic anhydride as catalyst. 20 g. of octanoic anhydride were formed after 24 hours at reflux.

EXAMPLE 6

A mixture of 60 g. of benzoic acid and 0.5 g. of trimellitic anhydride in a 250 ml. flask was heated to reflux for 6 hours. Water vapor (about 2 ml.) produced by the dehydration reaction was condensed in a Dean-Stark trap. The product consisted of a mixture of benzoic acid and benzoic anhydride.

I claim:

1. A method for preparation of an anhydride of a monocarboxylic acid comprising contacting an aliphatic, alicyclic, aromatic or heterocyclic monocarboxylic acid having 2 to 18 carbons with 0.001–10 weight percent of an aliphatic, alicyclic, aromatic or heterocyclic 1,3-dicarboxylic acid having 4 to 22 carbons or an anhydride thereof at a temperature sufficient to form the anhydride of said monocarboxylic acid and byproduct water.

2. The method of claim 1 in which the monocarboxylic acid is cyclohexanecarboxylic acid.

3. The method of claim 1 in which the monocarboxylic acid is octanoic acid.

4. The method of claim 1 in which the monocarboxylic acid is benzoic acid.

5. The method of claim 1 in which the 1,2-dicarboxylic acid is succinic acid.

6. The method of claim 1 in which the 1,2-dicarboxylic anhydride is phthalic anhydride.

7. The method of claim 1 in which the 1,2-dicarboxylic anhydride is trimellitic anhydride.

8. The method of claim 1 in which the temperature of the dehydration is from about 200° to 300° C.

9. The method of claim 2 wherein the said anhydride of said dicarboxylic acid is phthalic or trimellitic anhydride.

10. The method of claim 3 wherein the anhydride of said dicarboxylic acid is trimellitic anhydride.

11. The method of claim 4 wherein the anhydride of said dicarboxylic acid is trimellitic anhydride.

References Cited

UNITED STATES PATENTS

| | | | |
|---|---|---|---|
| 2,411,567 | 11/1946 | Fisher | 260—413 |
| 3,281,462 | 10/1966 | Riesser et al. | 260—546 |

ELBERT L. ROBERTS, Primary Examiner

U.S. Cl. X.R.

260—546

UNITED STATES PATENT OFFICE
CERTIFICATE OF CORRECTION

Patent No. 3,513,180  Dated May 19, 1970

Inventor(s) Donald M. Fenton

It is certified that error appears in the above-identified patent and that said Letters Patent are hereby corrected as shown below:

Claim 1, column 2, line 67 "1,3-" should be -- 1,2- --.

SIGNED AND SEALED
OCT 20 1970

(SEAL)
Attest:

Edward M. Fletcher, Jr.
Attesting Officer

WILLIAM E. SCHUYLER, JR.
Commissioner of Patents